US006338072B1

(12) United States Patent
Durand et al.

(10) Patent No.: US 6,338,072 B1
(45) Date of Patent: Jan. 8, 2002

(54) DEVICE AND PROCESS FOR DYNAMICALLY CONTROLLING THE ALLOCATION OF RESOURCES IN A DATA PROCESSING SYSTEM

(75) Inventors: Daniel Lucien Durand, Montigny le Bretonneux; Gérard Sitbon, Vitry; François Urbain, Paris, all of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/119,605

(22) Filed: Jul. 22, 1998

(30) Foreign Application Priority Data

Jul. 23, 1997 (FR) ............................................. 97 09369

(51) Int. Cl.$^7$ ............................................. G06F 17/30
(52) U.S. Cl. ............................. 707/205; 707/9; 707/10; 709/103; 709/104; 709/105
(58) Field of Search ............................. 707/205, 7, 10, 707/104, 200, 9; 709/100, 101, 102, 103, 104, 105, 106, 107, 229; 700/99, 100, 101; 455/452, 453; 706/14

(56) References Cited

U.S. PATENT DOCUMENTS

| 5,586,219 A | * | 12/1996 | Yufik | 706/14 |
| 5,835,765 A | * | 11/1998 | Matsumoto | 709/102 |
| 5,838,968 A | * | 11/1998 | Culbert | 709/104 |
| 6,026,403 A | * | 2/2000 | Siefert | 707/10 |
| 6,058,426 A | * | 5/2000 | Godwin et al. | 709/229 |

FOREIGN PATENT DOCUMENTS

| EP | 0366344 | 10/1989 |
| EP | 0753812 | 7/1996 |
| WO | 9508807 | 8/1994 |

OTHER PUBLICATIONS

Nieh et al., "The Design of SMART: A Scheduler for Multimedia Applications", Technical report, computer systems laboratory, Stanford University, pp. 1–18, Jun. 1996.*

Ronngren et al., "Empirical evaluation of weighted and prioritized static scheduling heuristics for real–time multi-processing", Proceedings: 2nd workshop on parallel and distributed real–time systems, pp. 58–63, Apr. 1994.*

Too–seng et al., "Task and resource assignment in distributed real–time systems", Proceedings: 2nd workshop on parallel and distributed real–time systems, pp. 43–51, Jun. 1996.*

Japanese Patent Appln Laying Open (KOKAI) No. 61–118841, laid open to public Jun. 6, 1986, relevant parts translated and attached.

Japanese Patent Appln. Laying Open (KOKAI) No. 56–36745, laid open to public Apr. 10, 1981, relevent parts translated and attached).

Japanese Patent Appln. Laying Open (KOKAI) No. 56–36746 laid open to public Apr. 10, 1981, relevant parts translated.

Japanese Patent Application Laying Open (KOKAI) No. 62–210546 laid open to public Sep. 16, 1987, relevant parts translated.

Japanese Patent Appln. Laying Open (KOKAI) No. 62–19957 laid open to public Jan. 28, 1987, relevant parts translated.

Japanese Patent Appln. Laying Open (KOKAI) No. 5–313921 laid open to public Nov. 26, 1993, relevant parts translated.

* cited by examiner

*Primary Examiner*—Sanjiv Shah
(74) *Attorney, Agent, or Firm*—Miles & Stockbridge P.C.; Edward J. Kondracki

(57) ABSTRACT

A system and process for dynamically controlling the allocation of resources in a "UNIX" open data processing system that includes a local resource manager, wherein the system is configured to sort jobs by dimension, which is defined as a set of currently executed processes which have the same importance from the point of view of the local resource manager. The system is configured to assign a relative weight to each of the dimensions by the user, and to adjust execution priorities of the jobs of each dimension as a function of the relative weights of the dimensions when the system is heavily loaded.

9 Claims, 9 Drawing Sheets

Utilization of Resources by Current Active Processes

| Util | Pid | Command | Dimension | Job | Start | Uti Cpu | Sys Cpu | %Cpu | Real mem | Virt mem | Diff |
|------|-------|------------|------------|-----|----------|---------|---------|-------|----------|----------|------|
| geo  | 15722 | X          | System     | -   | 09:58:24 | 1,26s   | 0,70s   | 19,60 | 1365     | 1077     | 20   |
| geo  | 15272 | maker 3X.exe | Framemaker | - | 09:58:41 | 0,48s   | 057s    | 10,50 | 1756     | 1063     | 20   |
| root | 1     | Init       | System     | -   | 14:40:42 | 0,97s   | 0,03s   | 10,00 | 65       | 76       | 20   |
| root | 29936 | LRMDemon   | LRMD       | -   | 14:49:31 | 0,12s   | 0,29s   | 4,10  | 419      | 357      | 0    |
| root | 46962 | Visit      | LRMD       | -   | 15:25:42 | 0,07s   | 0,06s   | 1,30  | 403      | 205      | 0    |
| geo  | 40344 | mwm        | System     | -   | 09:58:38 | 0,03s   | 0,04s   | 0,70  | 266      | 172      | 20   |
| root | 1032  | gil        | System     | -   | 14:34:05 | 0,00s   | 0,05s   | 0,50  | 10       | 10       | 41   |
| root | 24150 | StatUtil   | StatUtil   | -   | 14:45:02 | 0,00s   | 0,05s   | 0,50  | 164      | 191      | 0    |
| root | 50904 | LRMinfo    | LRMD       | -   | 15:31:12 | 0,00s   | 0,05s   | 0,50  | 30       | 15       | 0    |
| geo  | 10240 | xterm      | System     | -   | 14:46:24 | 0,02s   | 0,01s   | 0,30  | 202      | 113      | 20   |
| root | 3480  | asterix    | System     | -   | 17:00:04 | 0,01s   | 0,00s   | 0,10  | 183      | 93       | 20   |
| geo  | 14426 | xv         | System     | -   | 15:24:54 | 0,01s   | 0,00s   | 0,10  | 1184     | 1029     | 20   |
| geo  | 19070 | xload      | System     | -   | 09:58:36 | 0,00s   | 0,01s   | 0,10  | 96       | 58       | 20   |
| root | 23368 | mogind     | System     | -   | 14:46:25 | 0,00s   | 0,01s   | 0,10  | 95       | 72       | 20   |
| geo  | 46412 | mogin      | System     | -   | 14:48:25 | 0,00s   | 0,01s   | 0,10  | 9516     | 38       | 20   |

Exit

FIG. 2G

DEVICE AND PROCESS FOR DYNAMICALLY CONTROLLING THE ALLOCATION OF RESOURCES IN A DATA PROCESSING SYSTEM

FIELD OF THE INVENTION

The present invention relates to a device and a process for dynamically controlling the allocation of resources in a data processing system.

BACKGROUND OF THE INVENTION

The invention relates to of data processing operations in an industrial environment and particularly to data processing systems of the "open" type running on "UNIX" type software. The servers that run on this type of software are called "open" servers and at present are highly valued.

The drawback of these servers is that they were developed for academic applications whose purposes were not the same as those for industrial purposes. Thus, in a "UNIX" operating system, the jobs, or more precisely each of the processes comprising the jobs are assigned an initial priority, either by the system or by the user who enters these jobs. In order for a job to be given a higher priority by the system, the user must explicitly assign it an initial priority, or manually modify its priority using an administrative command. Thus, there is no control over or inter-correlation between the priority levels assigned to one job or another.

Likewise, there is no automatic correlation between the state of a system in terms of work load and the management of job priorities. Thus, when there is no control, all the processes have the same rights and the law of numbers prevails. If M1, M2 and M3 are three groups of non-critical processes that are more numerous and more active than the system processes S1, S2 and S3 and the critical "batch" processes (BATCH) B1, B2 and B3, they will use up most of the resources. In a standard "UNIX" system, the processes can start up without any limitation, even on heavily loaded systems, without any attention to the number of resources currently being used by the processes executed and without any attention to the number of resources the new process will require. This results in the following undesirable behavior: a group of processes is executed, the critical processes as well as the non-critical processes, and the critical processes, which must be completed within a time desired by the user, have too few resources available to be completed within the desired time. At the same time, non-critical processes are using too many resources.

SUMMARY OF THE INVENTION

Thus, the first object of the invention is to propose a process for dynamically controlling processes and jobs, a job being a serial or parallel chain of processes, which makes it possible to eliminate these drawbacks.

This object is achieved due to the fact that the process for dynamically controlling processes in an open data processing system of the "UNIX" type is comprised of:

sorting the jobs by dimension;

having the user assign a relative weight to each of the dimensions;

adjusting the execution priorities of the jobs of each dimension as a function of the relative weights of the dimensions when the system is heavily loaded.

According to another characteristic, when the system is using the hardware resources in excess of an important threshold, the process will dynamically modify the priority associated with the jobs in progress as a function of the dimensions to which they belong.

According to another characteristic, when the hardware occupancy rate of the system falls below a certain threshold, the process re-establishes the initial job priorities.

Another object of the invention is to propose a device for dynamically controlling jobs.

In accordance with this object, the device for dynamically controlling jobs executed in a "UNIX" operating system is characterized in that it comprises:

means for sorting the jobs by dimension;

means for assigning a relative weight to each of the dimensions;

means for adjusting the execution priorities of the jobs of each dimension as a function of the relative weights of the dimensions when the system is heavily loaded.

According to another characteristic, the device comprises means for consulting the state of the system at regular time intervals, means for associating dimensions with the users' jobs, and means for giving a greater or lesser weight to each of these dimensions.

According to another characteristic, the system comprises means for dynamically modifying the priority associated with the jobs in progress as a function of the dimensions to which they belong.

According to another characteristic, the device comprises means for determining that the load on the system has fallen below a certain threshold and for re-establishing the initial job priorities.

BRIEF DESCRIPTION OF THE DRAWINGS

Other characteristics and advantages of the present invention will appear more clearly with the reading of the following description, given in reference to the appended drawings, in which:

FIG. 2Ca shows a view of the display shown during the selection of the "display" function from the "resources" component;

FIG. 2Cb shows a view of the screen after the "history" function has been selected from the "resources" component;

FIG. 2G shows the display produced after the selection of the "processes" function from the "dimensions" menu;

DESCRIPTION OF THE PREFERRED EMBODIMENTS

The term "process" or "job" hereinafter designates any execution of a program (and consequently, in particular, its environment in the system) at a given instant, the program in itself constituting an inert object stored on a disk in the form of an ordinary executable file. In "UNIX" systems, the existence of two types of processes is known:

system processes that are not bundled with any terminal, which are created at the startup of the system or on dates set by the administrator of the system, and which are not interrupted unless the system is halted. These include the "SWAPPER," a certain number of processes known as "demons" such as, for example, the process ensuring the proper usage of the printer in "SPOOL" or the process "CRON" which makes it possible to start jobs on a given date.

processes started by a particular user from a given terminal on a given date. In particular, the fact that it is housed in a terminal under a given identification causes the startup of a process corresponding to the execution of a file determined in advance for each user. This type of process almost always corresponds to the execution of a command language interpreter (BOURNE shell or C-shell). For informational purposes, it is also noted that the utilization of standard services by a user is implemented in a remote machine by means of commands, which in order to operate in the remote machine, require the existence of specific processes known as "demons."

Figure 1:
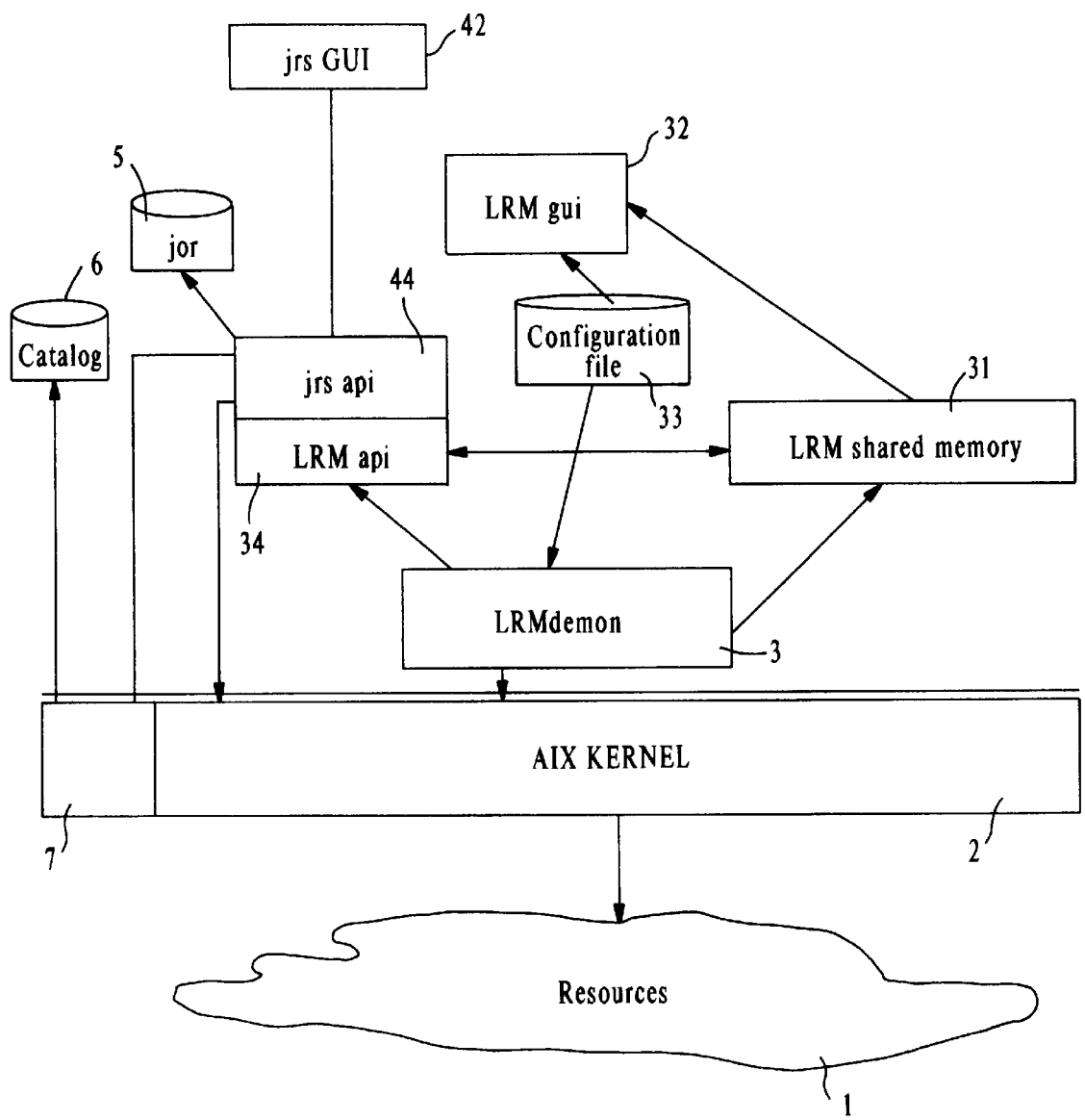
FIG. 1 shows a schematic view of the data processing system and the software means associated with the data processing system which allow the process of the invention to be implemented.

The structure of the "UNIX" system represented in FIG. 1 is constituted by the hardware resources of a data processing system 1, which communicates with a "UNIX" kernel (KERNEL) 2 that ensures the management of the memory and the low-level input-outputs and the chaining of various tasks (jobs). Used around this kernel are one or more "shell" type command language "interpreters," a messaging system and utility programs, which obviously include a C-language compiler.

To meet the needs of multitask applications in an open environment, two program modules based on these standard elements in "UNIX" systems were developed, one of which (JRS Job Reporting Service) provides reports on the execution of jobs started by a user, while the other (LRM) makes it possible to display the proper execution or the occurrence of failures and thus to detect the causes. This first module will be called the "JRS" (Job Reporting Service) and the other will be called the "LRM" (Local Resource Management) module.

Added to this, for purposes of the invention, is a local resource management demon (daemon) 3 which communicates with the kernel 2 and with an application program interface 34. This demon (daemon) 3 also communicates with an LRM configuration file 33 stored in the hard disk, and with an associated graphical user interface (LRM gui) 32. The application program interface 34 communicates with the demon 3 and with a shared memory 31. This shared memory is also in communication with the graphical user interface 32 and the demon 3. For purposes of pre-allocation, the system incorporates a "JRS" application program interface 44 for reporting the execution of jobs (Job Reporting Service). This application 44 communicates with a "jor" catalogue which stores the job report in a distinct file 5 of the hard disk. This application program interface 44, once it has been activated and the job report files have been stored, communicates with the local resource management demon 3 so as to allow the pre-allocation and dynamic control of resources. The interface 44 comprises the lines of code that are necessary to allow the execution of the commands available to the user through this interface. The commands available through this interface 44 are the following:

a command "JRS" which makes it possible to send a command to the resource manager and to generate the execution of a report file. This command, allows a plurality of options which make it possible to determine the number of pages of virtual memory, the quantity of space in the temporary files, the dimensions defined by the users, the anticipated CPU time consumption, the maximum elapsed time, the maximum CPU time, the maximum space for the temporary files, the maximum number of pages of virtual memory. The description of command "JSR" and the significance of the different parameters is as follows:

a command "JRSjobstart" (int jobid ; int qflag ; struct JRS_resources *JRS_resources ;) in which the parameter jobid is the job identifier, and JRS-resources is the structure describing the resources required for the job. This can be 0 if the job does not require any pre-allocation of resources. The "qflag" parameter, when it is not null, indicates that the job will wait for the availability of the resources. This command verifies whether the job can start; if it cannot start, the system waits until the resources are available, which is the case when "qflag" is null. If "qflag" is not null, it causes an immediate return. If the job can start, a value 0 is returned; if not, when "qflag" is positioned, a value −1 is returned. Moreover, each major event of a job is stored as it occurs in a global file "logc" of the catalog "jor." In order to avoid having to explicitly define the parameters for each job entry, the application "JRS" 44 provides the capability to declare resources in a script. Thus, when the developer of an application has defined the resources needed for his job, he can insert the latter into the script. The job will be entered by the command "JRS" without any other parameter. The syntax for these command lines is the following:

option-p "Number of pages of virtual memory"
option-t "Amount of temporary file space"
option-d "Function defined by the user"
option-c "Anticipated CPU time"
option-e "Maximum elapsed time"
option-C "Limit of CPU time consumed"
option-P "Maximum number of pages of virtual memory"
option-T "Maximum temporary file space"

In case of a conflict, the value specified at the entry of a command is used as follows: if there is a line in the script such as option-C 200 and if the script is entered with the following command line:

JRS-C 300 script, then the value used for the CPU limit is 300.

With a system equipped in this way with the local resource management module, the non-critical processes should alter the continued execution of the critical processes as little as possible. Each type of process has a specific importance. More or fewer resources should be allocated to it as a function of this importance and as a function of the load on the system. For this reason, The module "LRM" makes it possible to sort the processes by dimension. A dimension is a set of currently executed processes which have the same importance from the point of view of the local resource manger. By default, five dimensions are included: a first dimension "SYSTEM," a second dimension "BATCH," a third dimension "MISC," a fourth dimension DB (data base) and a fifth dimension TP (transfer protocol). If the processes are started by the normal users directly in the background, they belong to the dimension "MISC." If the processes are started by means of a script, entered into the job management application without any declaration of explicit dimensions, they belong to the third dimension "BATCH". If the processes do not belong to any other dimension, they belong to the dimension "SYSTEM." The dimensions "DB" and "TP" are provided without any definitions of processes and can be defined by the user. With the exception of the dimension "SYSTEM," it is possible for each dimension to have a relative weight, which is stored in a file. This relative weight is used to manage the priority of the processes comprising the dimension. The priority of all the processes belonging to a dimension will vary accordingly. The dimension "SYSTEM" has no relative weight and the priorities of the processes belonging to this dimension are not modified by the local resource manager (LRM). The processes controlled by the dimensions will always have resources allocated as a function of their relative weight, even if the system is heavily loaded. At the moment of the startup of the local resource manager, or when a dimension is created without specifying any relative weight, by default this dimension will have a weight of −1, which means that it exists, but that it is not controlled. A dimension can also be activated or deactivated. If it is deactivated, the entered jobs belonging to it will not be started, but the jobs in the process of being executed in this dimension will continue to be executed.

When a process results from a job execution command "JRS," it belongs to the dimension specified, if in fact a dimension has been specified in the command "JRS." When the process has an ancestor whose command name and user are associated with a dimension, the process belongs to this dimension. During the run time of a process, the relative weight will be used to manage and modify the priority of the processes comprising the dimension. The priority of all the processes in a dimension will vary accordingly. The processes of the dimension "MISC" will have a "NICE" at its maximum value, that is the lowest priority, when the system is heavily loaded. This means that the priority is higher than a threshold defined by the administrator in the configuration files. In a "UNIX" system, the "NICE" is an indicator associated with a process, the value of which is inversely proportional to the priority. The control mechanism of the invention is optional, and there are two ways to record the user applications in the dimensions. The dimension identifier can be provided explicitly by entering application jobs through the job program. The process of an application can be associated with a dimension by indicating the name of the command executed by the process and the user under whose name the process is executed. The dynamic priority control mechanism according to the invention involves considering two values. A first value "Pdc" represents the current percentage of resources used by all the processes belonging to the dimension. A second value "Pde" represents the percentage of resources which should be used by the dimension. The first value "Pdc" is obtained by periodically scanning the table of system processes, by associating the processes with their dimension and by calculating, for each dimension, the sum of the resources used by each process of the dimension.

The second value "Pde" is calculated according to the following formula:

$$Pde = \frac{Rd}{\sum R_i} * Pns$$

"Rd" is the relative weight of the dimension. "$R_i$" is the relative weight of each dimension. The sum "$\Sigma R_i$" is the sum of all the relative weights of all the dimensions that have had activity during the period of time in question. "Pns" is the percentage of resources used by processes not belonging to the dimension "SYSTEM" which have a relative weight and have consumed resources during the time interval in question. If the difference between "Pdc" and "Pde" is greater than a predetermined threshold value, the value "NICE" of the process belonging to the dimension is modified in one direction or another. The greater the difference, the more the value "NICE" is modified. The range of variation of the value "NICE" is between 0 and 40. The value "NICE" is set at the value 26 for the dimension "SYSTEM." When the value "NICE" increases, the priority decreases. For example, in a system having a dimension "MYDIM," the latter can be defined in the system with a relative weight of 2, a relative weight of 1 having been declared for the dimension "BATCH." When the system is heavily loaded, the priorities of the processes belonging to the dimension "MYDIM" will be modified in the following way:

If the processes of the dimensions "MYDIM" and "BATCH" are using 90% of the central processing unit (CPU), the priority of the processes of the dimension "MYDIM" will be modified in one direction or another so that the percentage of CPU used by the dimension "MYDIM" will be closer to 60%.

Figure 2A:
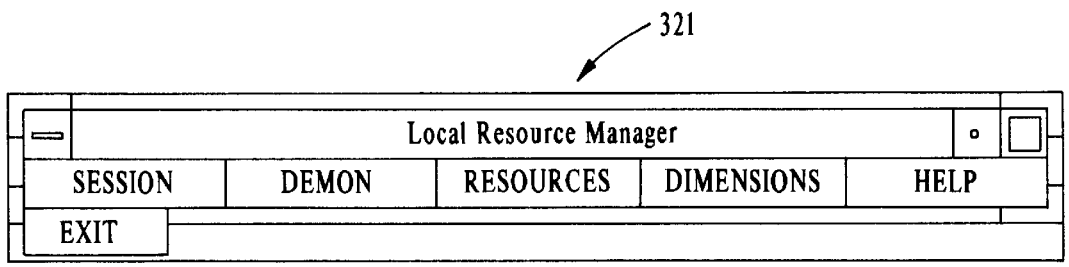
FIG. 2A shows a view of the menu bar of the window displayed on the screen during the startup of the local resource management program according to the invention.
Figure 2B:
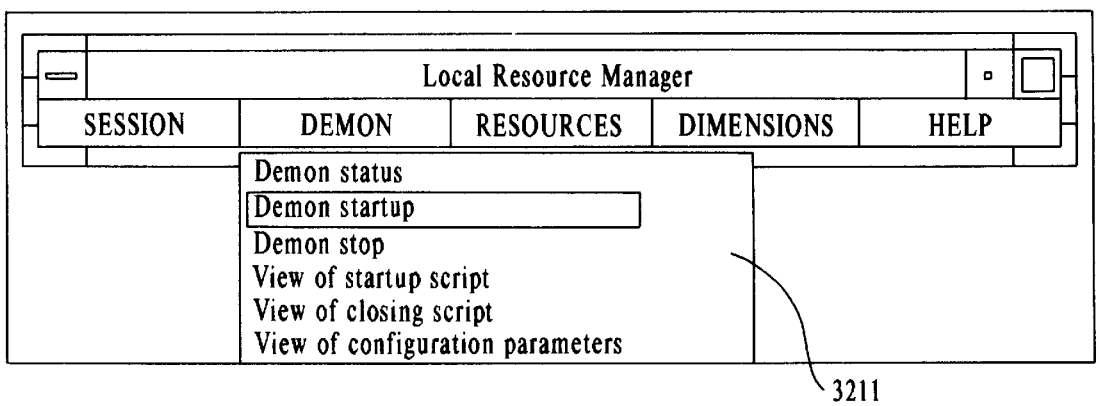
FIG. 2B shows a view of this main menu after the selection of one of the components from the menu of the preceding window.

On the other hand, the "LRM" application program interface 34 is associated with a graphical user interface "LRM gui" 32. This interface 32 allows the user, by acting on a mouse or an element other than a mouse, to trigger external events processed by a preprogrammed graphical interface capable of recognizing these events such as for example the pressing or release of a button, dragging, and logical events such as the entry of the mouse pointer into a window. This interface 32 also allows the user, again by acting on a mouse or an element other than a mouse, to trigger processes in the graphical interface which make it possible, from the general menu represented in FIG. 2A, to bring up a window 321 comprising the various components of a menu, which is constituted by the terms session, demon, resources, dimensions, help. This menu makes it possible to select a component using a mouse. After having clicked on the mouse button, the selection of the component, after processing by the graphical interface program, brings up a sub-menu like the one in FIG. 2B for the component "demon." This sub-menu 3211 makes it possible, using the mouse, to highlight or bold one of the components of this sub-menu, which comprises a function allowing the display of the status of the demon, the startup of a demon, the stopping of a demon, the viewing of a startup script, the viewing of a closing script and the viewing of configuration parameters.

Figure 2C:
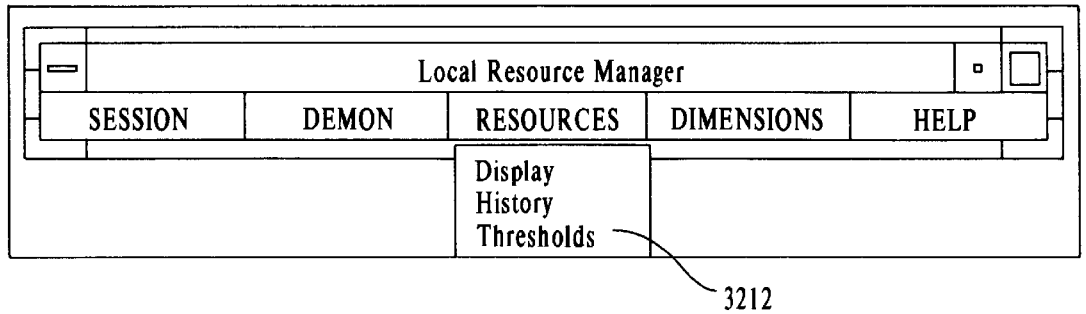
FIG. 2C shows a view of this main menu after the selection of another component from the menu.

The selection of the "resources" component by the mouse, after processing by the graphical interface program, allows the display of a sub-menu 3212 as shown in FIG. 2C. This sub-menu comprises the capability to select one of the following functions: display, history, thresholds. The selection of the "display" function, as shown in FIG. 2Ca, allows the interface "LRM gui", by extracting information from the files "jor," to display a window comprising a plurality of histogram bars representing, respectively, the percentage of utilization of the CPU, the percentage of utilization of real memory, virtual memory and temporary file space. The selection of the "history" function, as shown in FIG. 2C*b*, allows the interface "LRM gui," by extracting information from the files "jor," to represent the recent history of the consumption of resources in the system in 10-second periods, for each of the components of the system, namely CPU, real memory, virtual memory, temporary file space.

Figure 2D:
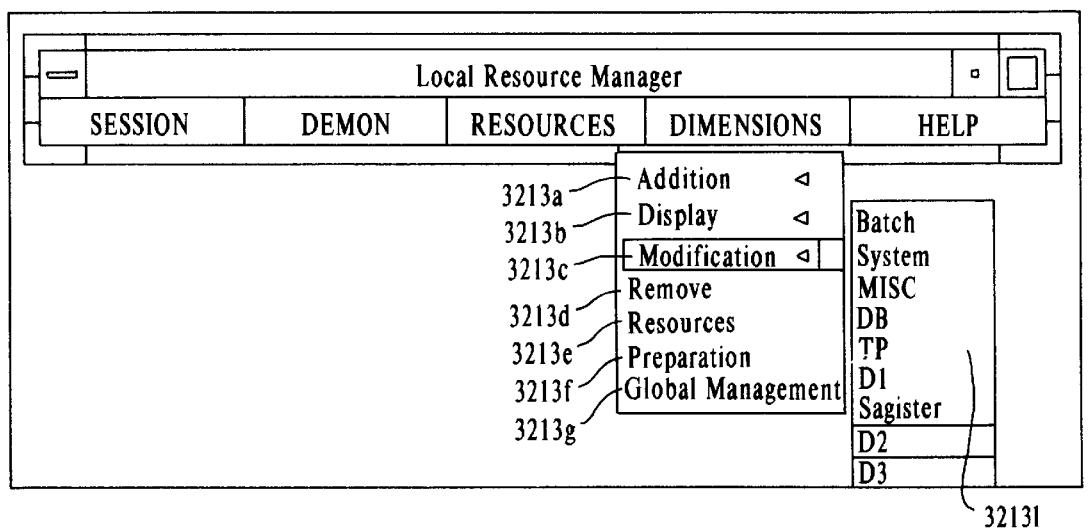
FIG. 2D shows a view of the preceding display after the selection of a "modification" function from the "dimensions" component, which makes it possible to display a sub-menu with the name of all the dimensions defined in the system.
Figure 2C:
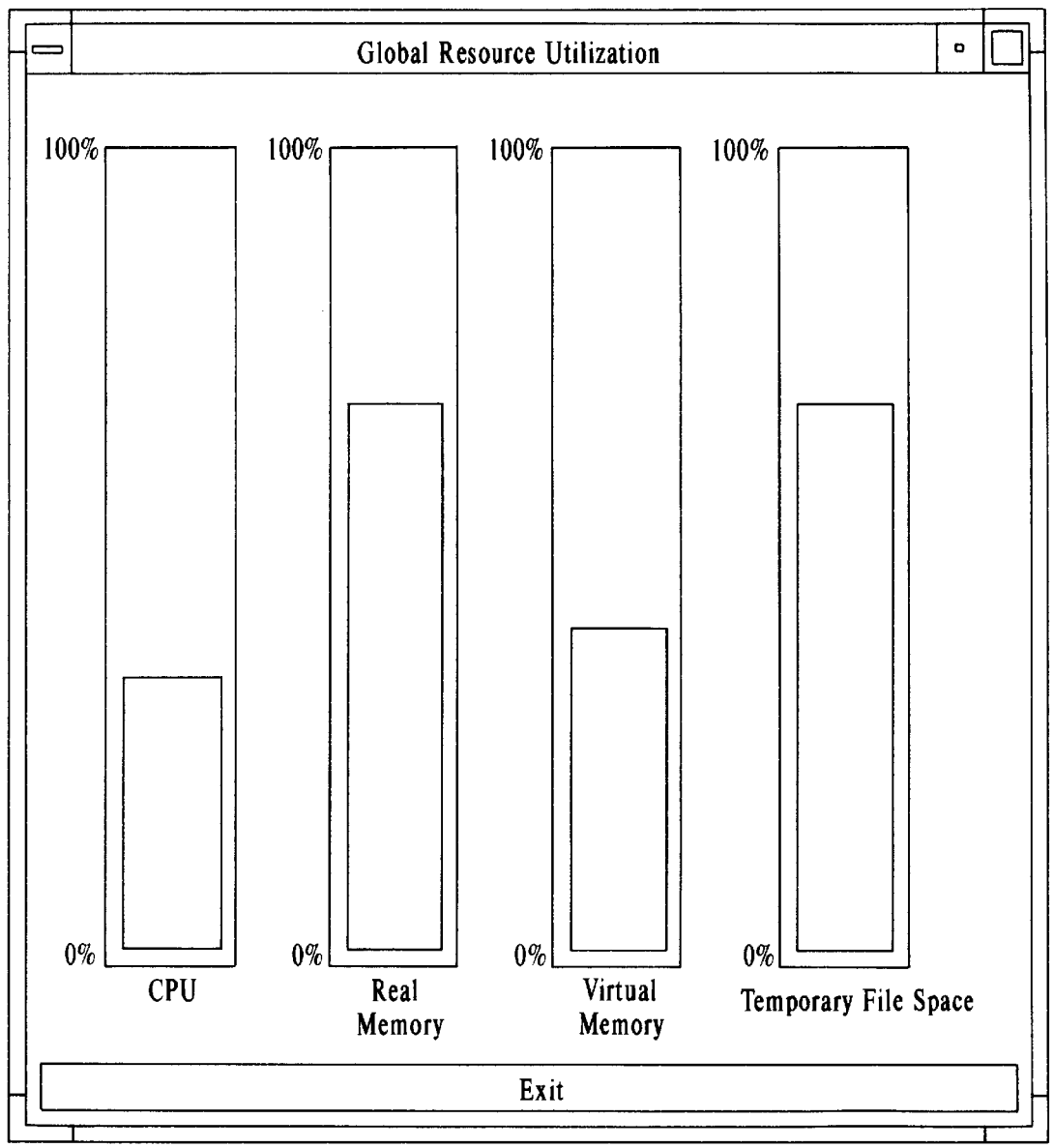
Figure 2C:
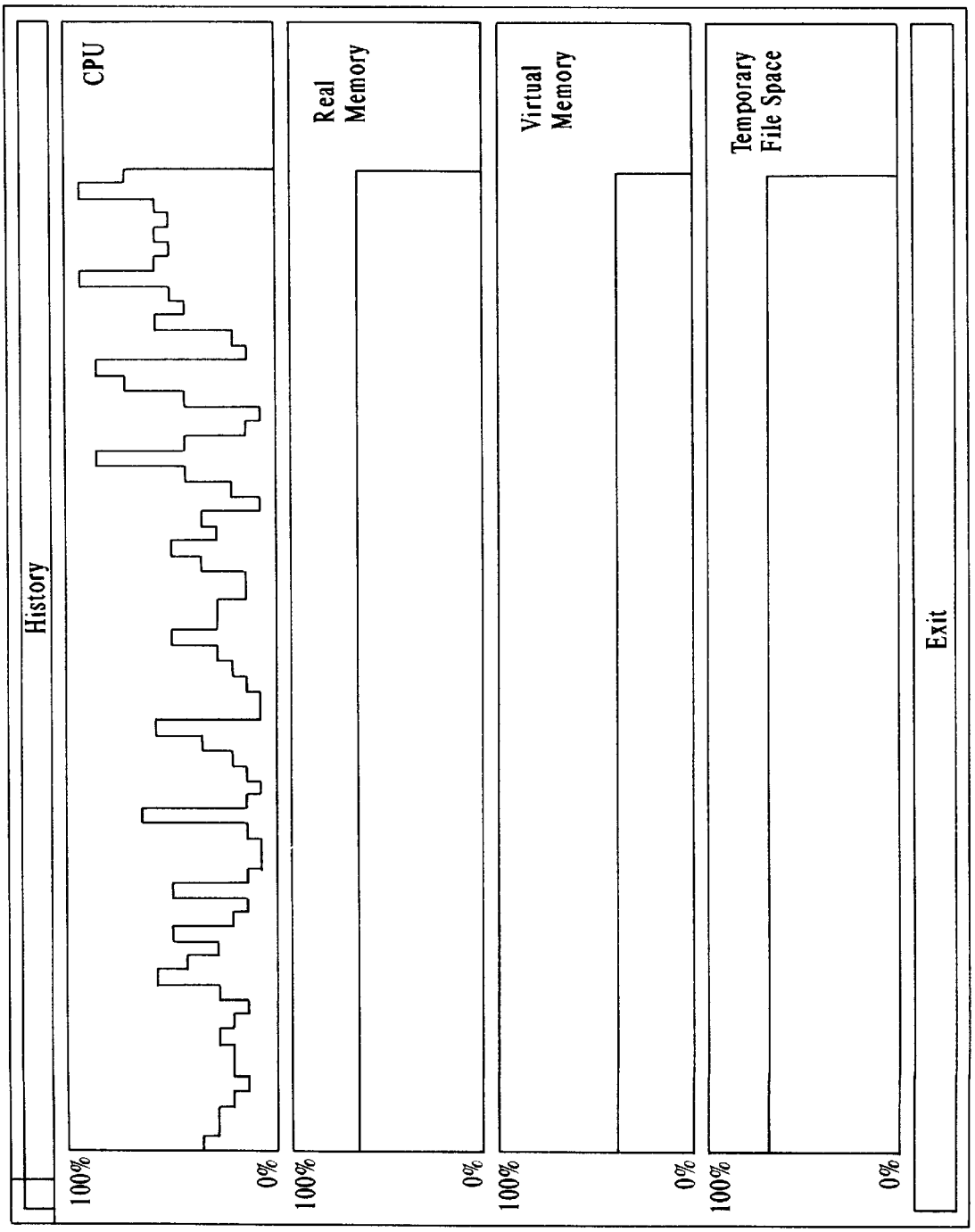
Figure 2E:
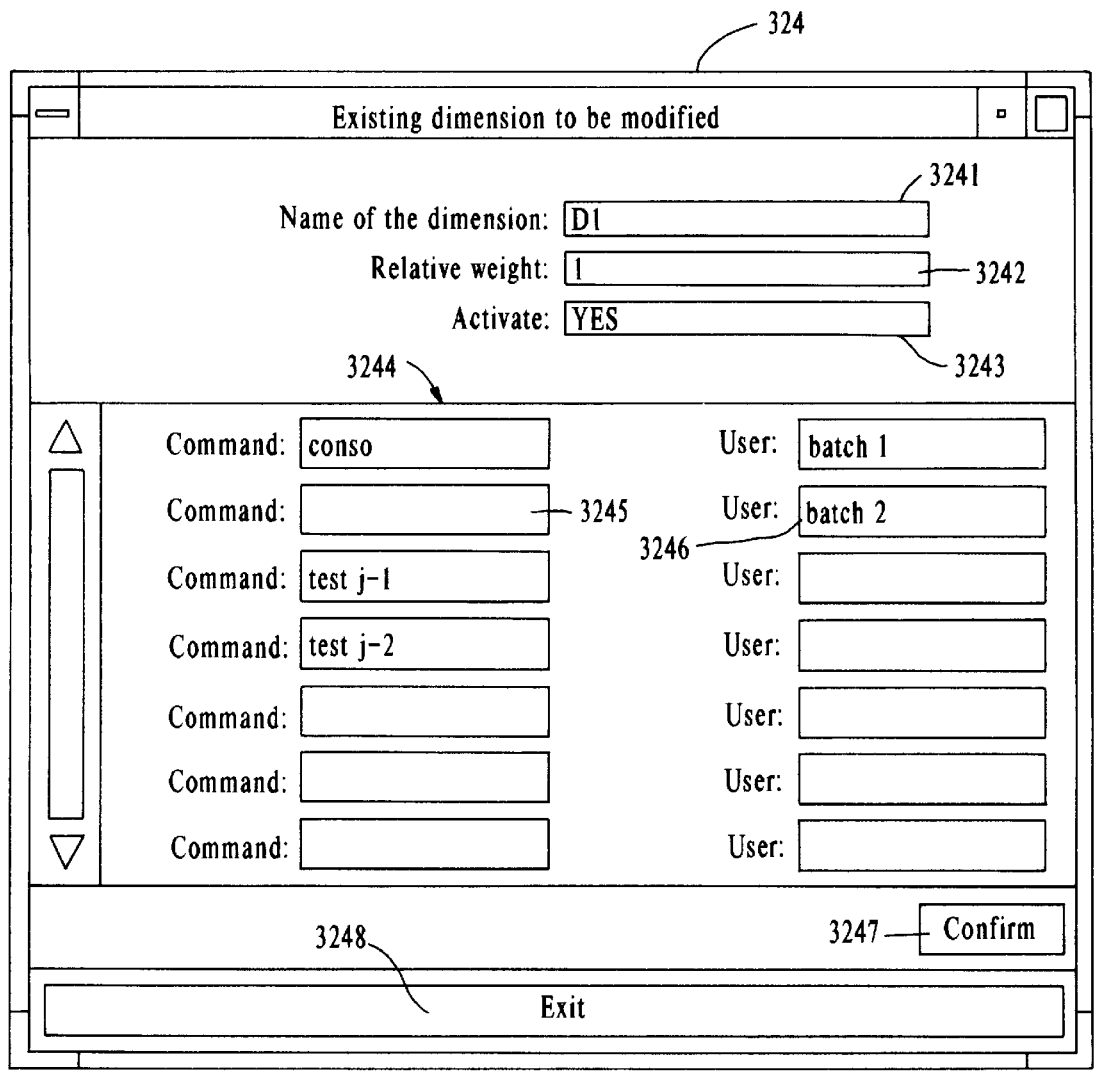
FIG. 2E shows the display produced after this selection.

FIG. 2D shows the display produced after the selection of the "dimensions" component from the main menu bar. This selection brings up a sub-menu comprising a plurality of possible functions, a first addition function 3213*a* which allows addition, a second display function 3213*b* which allows the display, a third modification function 3213*c* which allows modification, a fourth remove function 3213*d* which makes it possible to remove a dimension, a fifth resource function 3213*e* which makes it possible to know the resources consumed by a dimension, a sixth preparation or process function 3213*f* which makes it possible to know the processes, and a seventh global management function 3213*g* which makes it possible to know the global management. For example, when the user, using the mouse, selects the third function by highlighting it and validates this selection by clicking on the mouse button, this causes the highlighting of the "modification" function. This action, after processing by the graphical interface program, causes the appearance of a second sub-menu comprising, in a window 3231, a plurality of dimensions available in the system. The selection by means of the mouse of one of the available dimensions in this window from the second sub-menu, after processing by the graphical interface program, allows the display of FIG. 2E, which comprises a first alphanumeric box 3241 which makes it possible to define the name of the dimension, a second alphanumeric box 3242 which makes it possible to define the relative weight, and a third alphanumeric box 3243 which makes it possible to activate the dynamic control function. Lastly, the window also comprises a scrolling list 3244 which makes it possible to display in two separate columns, one assigned to commands, the other assigned to users, each of the commands and each of the users associated with each command. The user, using the mouse, can position the latter in one of the boxes 3245 of the "commands" column, or in one of the boxes 3246 of the "users" column and use the keyboard to enter the command to be executed as well as the associated dimension in the "users" column. Finally, a "confirmation" button 3247 and an "exit" button 3248 make it possible to confirm the information modifying the existing dimension, or to exit without making any modifications. In case of the selection of the "confirmation" button, the information is stored in the files "jor" and the relative weights thus entered or modified, will be used in the dynamic control process.

Figure 2F:
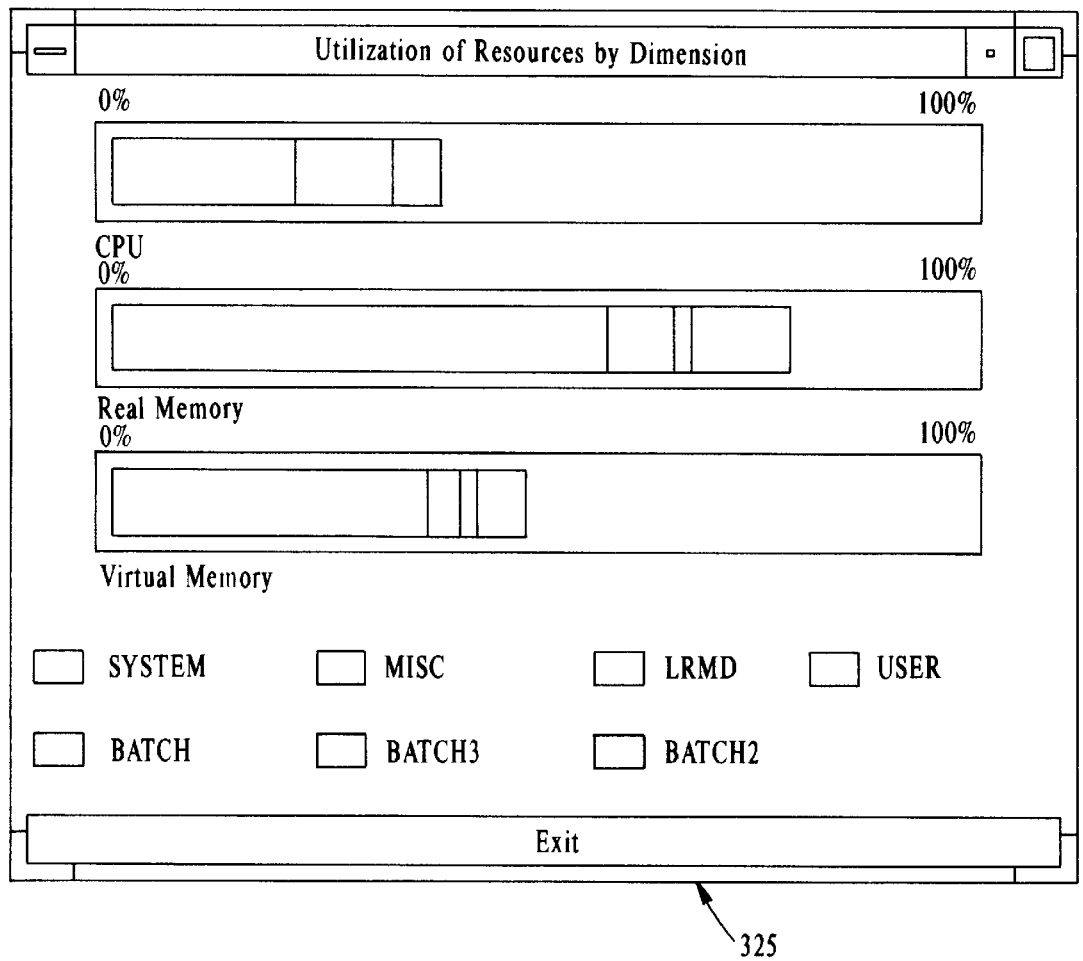
FIG. 2F shows the display produced after the selection of the "resources" function from the "dimensions" menu.
Figure 2H:
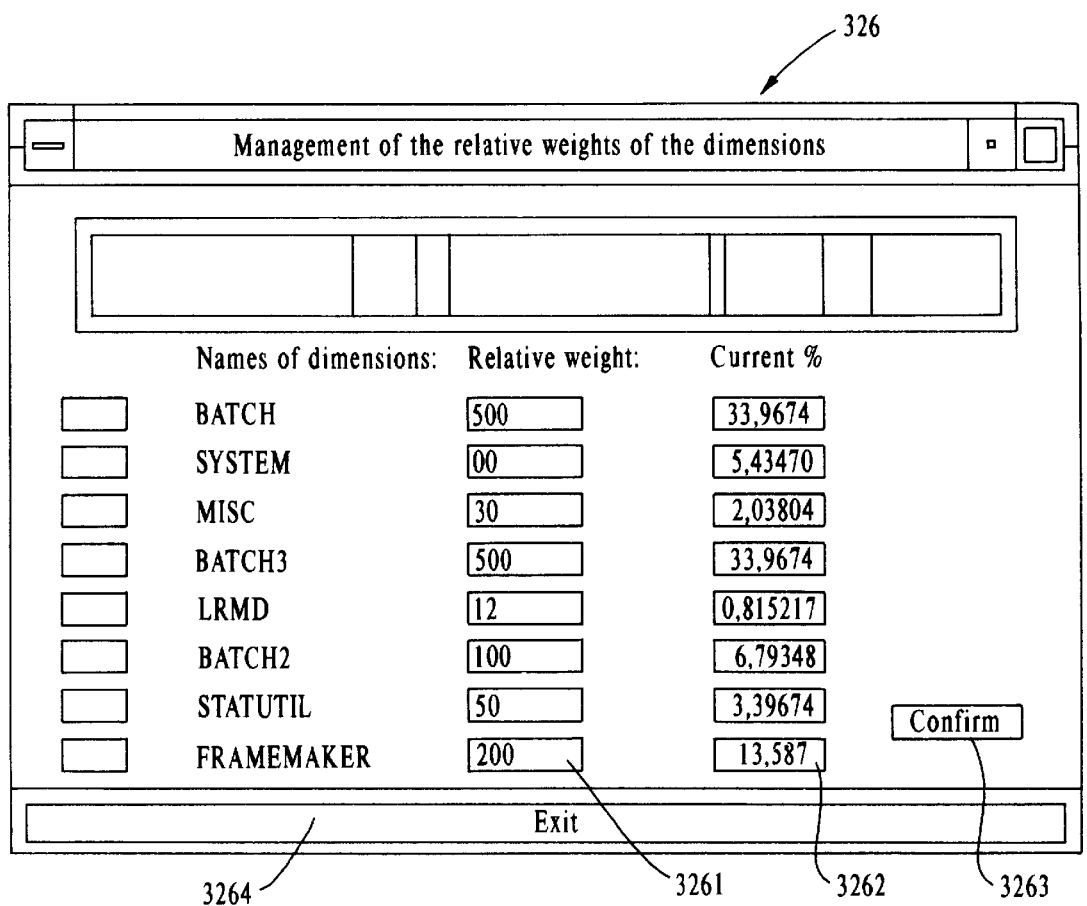
FIG. 2H shows the display produced after the selection of the "global management" function (GLOBAL MANAGEMENT) from the "dimensions" component.

FIG. 2F shows the display of a window indicating the utilization of resources by dimension, when the "resources" function has been selected from the menu 3213. This utilization is represented in the form of histograms, each of which is associated with one of the components of the system, namely CPU, real memory and virtual memory, for each of the dimensions. The representation of a histogram is obtained through processing by the graphical interface program. Likewise, the selection of the "processes" function makes it possible, after processing by the graphical interface program, to display in a window 2G a list of the processes that have consumed the most CPU time during the last ten seconds, along with their "NICE." Finally, the selection of the last function, "global management", makes it possible to display in a window shown in FIG. 2H, the management of the relative weights for each dimension. This allows the user to enter, in each box associated with each dimension, a new relative weight value and to display, in the box showing the current percentage, the modification of the current percentage. Lastly, for the "modification" function, a "confirmation" button 3263 and an "exit" button 3264 make it possible to confirm the relative weight modifications or to exit the function without making any modifications.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A process for dynamically controlling the allocation of resources in a UNIX type open data processing system including a local resource manager, the process comprising:

sorting jobs by dimension, said dimension being a set of currently executed processes which have the same importance from the point of view of the local resource manager;

assigning relative weight to each of the dimensions by the user;

adjusting execution priorities of the jobs of each dimension as a function of the relative weights of the dimension when the system is heavily loaded;

and a dynamic priority control mechanism which assigns the priority based on two values, the first value Pdc representing the current percentage of resources used by all the processes belonging to the dimension which is obtained by periodically scanning table of the system processes, by associating the processes with their dimension and by calculating, for each dimension, the sum of the resources used by each process of the dimension; and the second value Pde representing the percentage of resources which should be used by the dimension which is calculated according to $$Pde = \frac{Rd}{\sum Ri} * Pns$$

wherein Rd is relative weight of the dimension, Ri is relative weight of each dimension, $\Sigma Ri$ is the sum of all the relative weights of all the dimensions that have had activity during the period of time in question, and Pns is the percentage of resources used by the process not belonging to the dimension.

2. The process for dynamically controlling the allocation of resources in a UNIX type open data processing system according to claim 1, further comprising dynamically modifying the priority associated with the jobs in progress as a function of the dimensions to which they belong, when the system is using hardware resources in excess of a certain threshold.

3. The process for dynamically controlling the allocation of resources in a UNIX type open data processing system according to claim 2, further comprising the initial job priorities when the hardware occupancy rate of the system falls below said certain threshold.

4. The process for dynamically controlling the allocation of resources in a UNIX type open data processing system according to claim 1, further comprising re-establishing the initial job priorities when the hardware occupancy rate of the system falls below said certain threshold.

5. A device for dynamically controlling the allocation of resources in a UNIX type open data processing system including a local resource manager, the process comprising:

at least one module configured to sort jobs by dimension, said dimension being a set of currently executed processes which have the same importance from the point of view of the local resource manager;

at least one module configured to assign a relative weight to each of the dimensions; and at least one module configured to adjust execution priorities of the jobs of each dimension as a function of relative weights of the dimensions when the system is heavily loaded;

and a dynamic priority control mechanism which assigns the priority based on two values, the first value Pdc representing the current percentage of resources used by all the processes belonging to the dimension which is obtained by periodically scanning a table of the system processes, by associating the processes with their dimension and by calculating, for each dimension, the sum of the resources used by each process of the dimension; and the second value Pde representing the percentage of resources which should be used by the dimension which is calculated according to $$Pde = \frac{Rd}{\Sigma Ri} * Pns$$

wherein Rd is relative weight of the dimension, Ri is relative weight of each dimension, $\Sigma Ri$ is the sum of all the relative weights of all the dimensions that have had activity during the period of time in question, and Pns is the percentage of resources used by the process not belonging to the dimension.

6. The device for dynamically controlling the allocation of resources in a UNIX type open data processing system according to claim 5, further comprising at least one module configured to consult the state of the system at regular time intervals, and at least one module configured to associate dimensions with the jobs and at least one module configured to weigh the dimension by giving a greater or lesser weight to each dimension.

7. The device for dynamically controlling the allocation of resources in a UNIX type open data processing system according to claim 5, further comprising at least one module configured to dynamically modify a priority associated with the jobs in progress as a function of the dimensions to which they belong.

8. The device for dynamically controlling the allocation of resources in a UNIX type open data processing system according to claim 7, further comprising at least one module configured to determine when the system load has fallen below a certain threshold and for reestablishing the initial job priorities when the system load has fallen below said threshold.

9. The device for dynamically controlling the allocation of resources in a UNIX type open data processing system according to claim 5, further comprising at least one module configured to determine when the system load has fallen below a certain threshold and for reestablishing the initial job priorities when the system load has fallen below said threshold.

* * * * *